(12) United States Patent
Yao et al.

(10) Patent No.: US 11,824,434 B2
(45) Date of Patent: Nov. 21, 2023

(54) INTEGRATED DRIVER AND VOLTAGE CONVERTER

(71) Applicant: Silergy Semiconductor Technology (Hangzhou) LTD, Hangzhou (CN)

(72) Inventors: Kaiwei Yao, Hangzhou (CN); Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/352,780

(22) Filed: Jun. 21, 2021

(65) Prior Publication Data

US 2021/0408891 A1 Dec. 30, 2021

(30) Foreign Application Priority Data

Jun. 29, 2020 (CN) .......................... 202010602803.X

(51) Int. Cl.
*H02M 1/08* (2006.01)
*H02M 3/07* (2006.01)
(52) U.S. Cl.
CPC ............... *H02M 1/08* (2013.01); *H02M 3/07* (2013.01)
(58) Field of Classification Search
CPC ........ H02M 1/08; H02M 1/36; H02M 1/0095; H02M 3/07; H02M 3/072; H02M 3/158; H02M 3/073; H02M 3/077
See application file for complete search history.

(56) References Cited

U.S. PATENT DOCUMENTS

| | | | | |
|---|---|---|---|---|
| 6,392,926 B1* | 5/2002 | Huang | ................... | G11C 16/12 365/185.09 |
| 8,581,518 B2 | 11/2013 | Kuang et al. | | |
| 10,734,893 B1* | 8/2020 | Abesingha | ............. | H02M 3/07 |
| 10,958,166 B1* | 3/2021 | Low | ......................... | G05F 1/565 |
| 2011/0127925 A1 | 6/2011 | Huang et al. | | |
| 2012/0163632 A1* | 6/2012 | Lesso | ..................... | H02M 3/072 327/536 |
| 2014/0306674 A1* | 10/2014 | Kondou | ................ | H02M 3/158 323/271 |
| 2017/0318639 A1 | 11/2017 | Wang et al. | | |
| 2018/0295685 A1 | 10/2018 | Wang et al. | | |
| 2018/0295690 A1 | 10/2018 | Chen et al. | | |
| 2018/0310376 A1 | 10/2018 | Huang et al. | | |
| 2021/0167685 A1* | 6/2021 | Muntal | ............... | H02M 1/4266 |
| 2022/0131456 A1* | 4/2022 | Lai | ......................... | H02J 7/345 |

FOREIGN PATENT DOCUMENTS

CN 107346940 A 11/2017

* cited by examiner

*Primary Examiner* — Sibin Chen

(57) ABSTRACT

An integrated driver applied to a voltage converter having a switched capacitor conversion circuit, the integrated driver including: a first die having a first-type power transistor; a second die including at least one second-type power transistor, where a withstand voltage of the first-type power transistor is higher than a withstand voltage of the second-type power transistor; and where the first die and the second die are coupled in series between a high potential terminal and a low potential terminal of the voltage converter, such that the first-type power transistor receives a high voltage signal.

13 Claims, 7 Drawing Sheets

INTEGRATED DRIVER AND VOLTAGE CONVERTER

RELATED APPLICATIONS

This application claims the benefit of Chinese Patent Application No. 202010602803.X, filed on Jun. 29, 2020, which is incorporated herein by reference in its entirety.

FIELD OF THE INVENTION

The present invention generally relates to the field of power electronics, and more particularly to integrated drivers and voltage converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
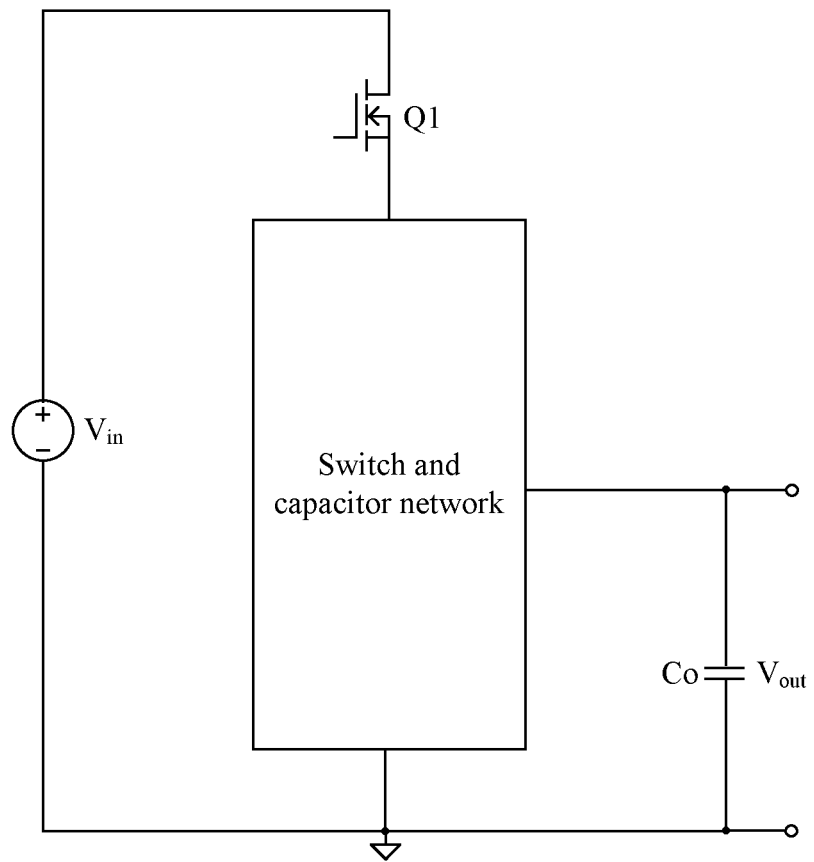
FIG. 1 is a schematic block diagram of a first example voltage converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In some switched capacitor DC/DC converters, the withstand voltage of a first transistor connected between an input terminal of the converter and a reference ground is an input voltage before or just after startup, and the withstand voltage of the first transistor is less than the input voltage during normal operation. Typically, the first transistor and other transistors are the same types of transistors, which may affect the safety of the first transistor and may not be conducive to high efficiency of the system.

In particular embodiments, an integrated driver is applied to a voltage converter including a switched capacitor conversion circuit, and the integrated driver can include a first die having a first-type power transistor, and a second die having a second-type power transistor. For example, the withstand voltage of the first-type power transistor is higher than that of the second-type power transistor. The first die and the second die can be coupled in series between a high potential terminal and a low potential terminal of the voltage converter, such that the first-type power transistor may receive a high voltage signal. For example, first-type power transistor can be a gallium nitride (GaN) power transistor. In this example, the high potential terminal is the input terminal of the voltage converter, and the low potential terminal is the reference ground of the voltage converter.

In other embodiments, the integrated driver may only include one die. For example, the integrated driver can include a first die having a first-type power transistor and a second-type power transistor, where the withstand voltage of the first-type power transistor is higher than that of the second-type power transistor. The first die can be coupled between a high potential terminal and a low potential terminal of the voltage converter, such that the first-type power transistor may receive a high voltage signal. For example, the first-type power transistor and the at least one second-type power transistor can share one substrate, and the first-type power transistor is a Si-based GaN power transistor.

In addition, the second-type power transistor can be a silicon transistor. The withstand voltage of the first-type power transistor can be the drain-source breakdown voltage of the first-type power transistor, and the withstand voltage of the second-type power transistor can be the drain-source breakdown voltage of the second-type power transistor. In addition, under the same withstand voltage level, the on-resistance of the first-type power transistor may be smaller than that of the second-type power transistor, and the parasitic capacitance of the first-type power transistor can be smaller than that of the second-type power transistor. For example, when the withstand voltage level is greater than 40V, the on-resistance and parasitic capacitance of the first-type power transistor may be smaller than those of the second-type power transistor.

Referring now to FIG. 1, shown is a schematic block diagram of a first example voltage converter, in accordance with embodiments of the present invention. The voltage converter can include first-type power transistor Q1, output capacitor Co, and a switch and capacitor network. A first terminal of first-type power transistor Q1 can connect with the input terminal of the voltage converter, and the switch and capacitor network can connect between a second terminal of the first-type power transistor and the reference ground. Also, output capacitor Co can connect between the output terminal of the voltage converter and the reference ground. The switch and capacitor network can include at least one second-type power transistor and at least one flying capacitor, and the connection of the flying capacitor may conform to the common connection of the switched capacitor conversion circuit.

Figure 2:
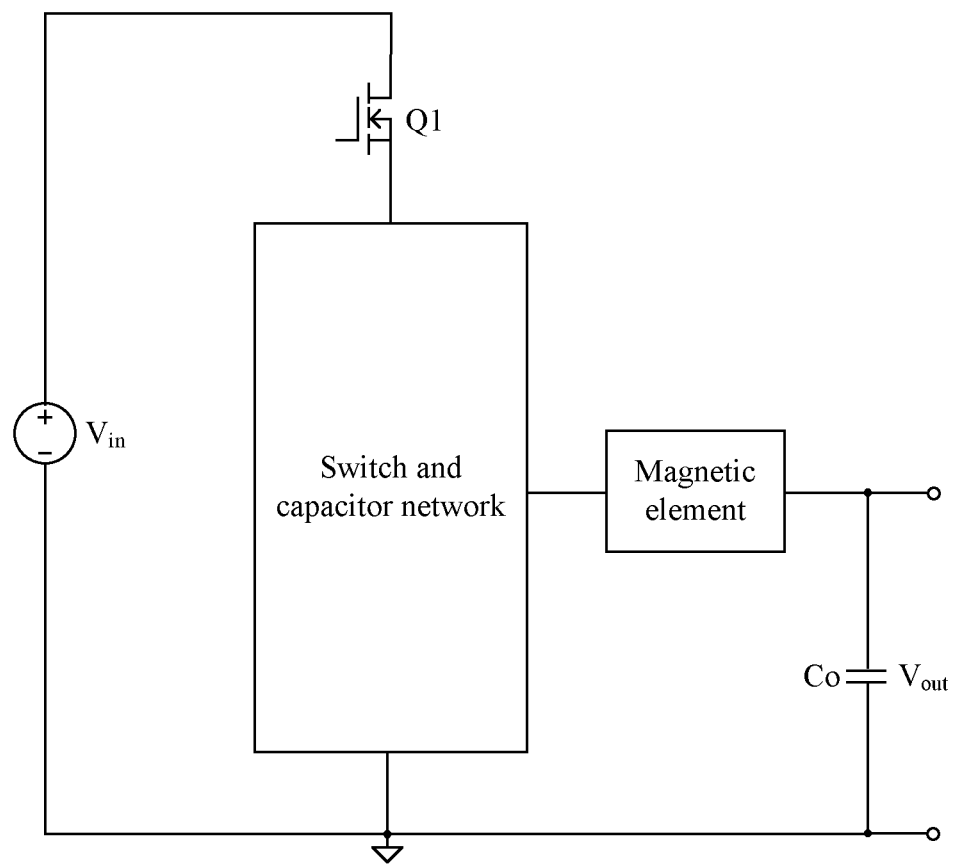
FIG. 2 is a schematic block diagram of a second example voltage converter, in accordance with embodiments of the present invention.

Referring now to FIG. 2, shown is a schematic block diagram of a second example voltage converter, in accordance with embodiments of the present invention. The voltage converter can also include a switching power stage circuit having a magnetic element, and the switching power stage circuit can multiplex at least two of the second-type power transistors, or can multiplex a first-type power transistor and a second-type power transistor. For example, the magnetic element is an inductor, and can connect between the switch and capacitor network and the output terminal. The voltage converter can also include a control circuit that controls the multiplexed power transistors in a pulse-width modulation (PWM) mode, a pulse-frequency modulation (PFM) mode, or a PWM/PFM hybrid mode, in order to adjust the output voltage. In other examples, the voltage converter may also include a multi-phase structure connected in parallel between the input terminal and the reference ground. That is, each phase structure can include first-type power transistor Q1 and a switch and capacitor network connected in series between the input terminal and the reference ground, and first-type power transistor Q1 in each phase structure can be a GaN transistor.

For example, the maximum withstand voltage of first-type power transistor Q1 can be the input voltage of the voltage converter. Before the voltage converter starts up, the voltage that the first-type power transistor bears can be greater than the voltage that the second-type power transistor bears. For example, before the voltage converter starts, a voltage across the path from the second terminal of the first-type power transistor to the reference ground via the switch and capacitor network can be zero. The voltage that the first-type power transistor bears during normal operation of the voltage converter can be smaller than the voltage that the first-type power transistor bears before startup of the voltage converter, and the voltage that the second-type power transistor bears during normal operation of the voltage converter can be smaller than the voltage that the first-type power transistor bears before the startup of the voltage converter. Further, the switch and capacitor network can include a plurality of second-types power transistors connected in series between the second terminal of the first-type power transistor and the reference ground.

In this example, first-type power transistor Q1 can be integrated into the first die, and one or more second-type power transistors can be integrated into the second die. For example, first-type power transistor Q1 is a GaN power transistor. In another example, first-type power transistor Q1 and second-type power transistor can be integrated into one die; that is, first-type power transistor Q1 and second-type power transistor may share one same substrate. For example, first-type power transistor Q1 can be a Si-based GaN power transistor. In addition, the at least one flying capacitor may not be integrated into the first die and the second die, and the flying capacitor can connect to the corresponding switch node pin of a package having at least one of the first die and the second die, in order to realize connectivity with the first die and the second die. The at least one magnetic element can be packaged above the first die and the second die, and each magnetic element can connect between a corresponding pin for the switch node of two multiplexed power transistors and an output pin, in order to realize connectivity with the first die and the second die. The control circuit can be integrated into the first die or the second die, or the control circuit can also be integrated into a third die.

Figure 3:
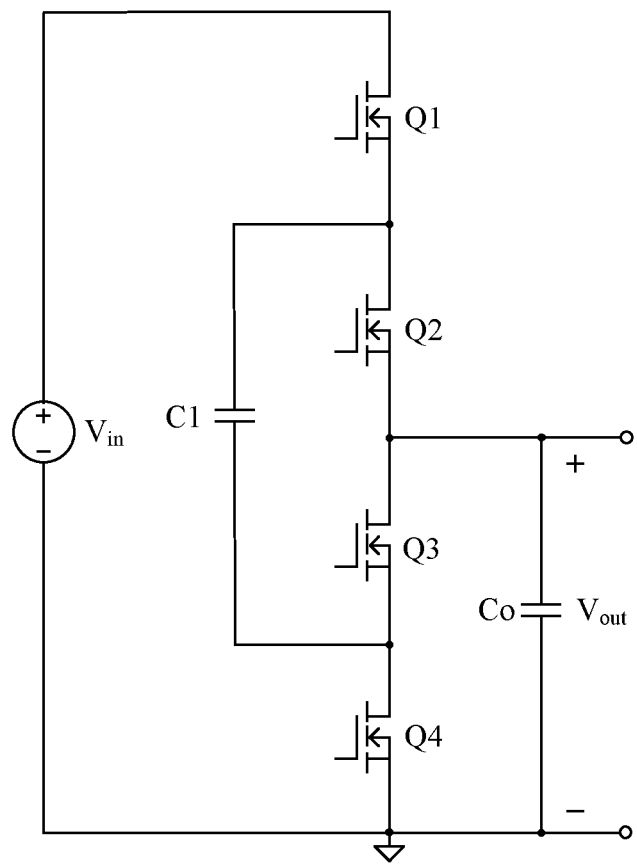
FIG. 3 is a schematic block diagram of a third example voltage converter, in accordance with embodiments of the present invention.

Referring now to FIG. 3, shown is a schematic block diagram of a third example voltage converter, in accordance with embodiments of the present invention. In this particular example, switch and capacitor network can include second-type power transistors Q2, Q3, and Q4 connected in series between the second terminal of first-type power transistor Q1 and the reference ground. The first-type power transistor and the second-type power transistors may form at least one first switch group, and each first switch group can include two transistors connected in series. In this examples, power transistors Q1 and Q2 may form one first switch group, and power transistors Q3 and Q4 may form another first switch group. The switch and capacitor network can also include flying capacitor C1 and output capacitor Co. For example, flying capacitor C1 can connect in parallel between the common node of power transistors Q1 and Q2 and the common node of power transistors Q3 and Q4, and output capacitor Co can connect between the common node of the two first switch groups (e.g., the common node of power transistors Q2 and Q3) and the reference ground. When the voltage converter operates stably, the voltages that power transistors Q1-Q4 bears can be ½Vin. However, before the voltage converter is started or has just started, output voltage $V_{out}$ and the voltage across flying capacitor C1 may both be 0V, and thus the voltage that first-type power transistor Q1 bears is input voltage $V_{in}$.

Figure 4:
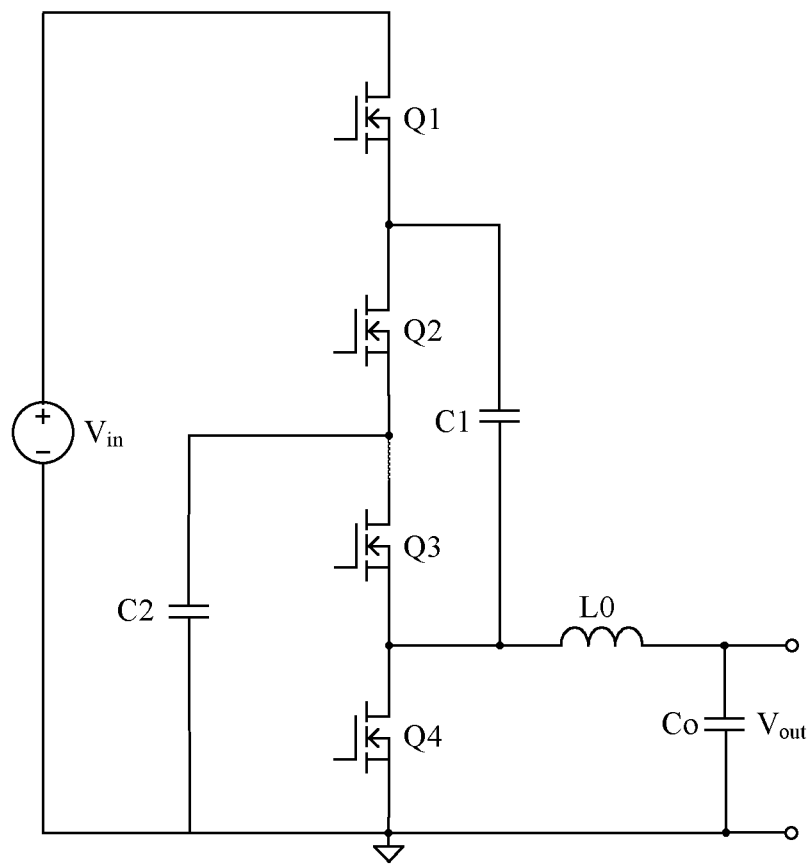
FIG. 4 is a schematic block diagram of a fourth example voltage converter, in accordance with embodiments of the present invention.

Referring now to FIG. 4, shown is a schematic block diagram of a fourth example voltage converter, in accordance with embodiments of the present invention. In this particular example, the voltage converter can include a switching power stage circuit that can include flying capacitor C2 and inductor L0. In this example, flying capacitor C2 can connect in parallel between the common node of the two first switch groups (e.g., the common node of power transistors Q2 and Q3) and the reference ground, inductor L0 can connect between the common node of power transistors Q3 and Q4 and the output terminal, and output capacitor Co can connect between the output terminal (e.g., the second terminal of inductor L0) and the reference ground. The switching power stage circuit can multiplex at least one first switch group. In this example, the switching power stage circuit can multiplex the first switch group including power transistors Q3 and Q4. In addition, the voltage converter can also include a control circuit (not shown) that controls the multiplexed power transistors in PWM mode, PFM mode, or PWM/PFM hybrid mode, in order to adjust the output voltage.

In other examples, the switch and capacitor network can include a transformer that replaces inductor L0, in order to form an isolated switching power stage circuit, and the primary circuit in the isolated switching power stage circuit can connect between the common node of power transistors Q3 and Q4 and the reference ground. For example, the primary circuit can include an inductor, a primary winding of the transformer, and a resonant capacitor that are connected in series. A secondary winding of the transformer coupled with the primary winding can also connect with a rectifier circuit.

Figure 5:
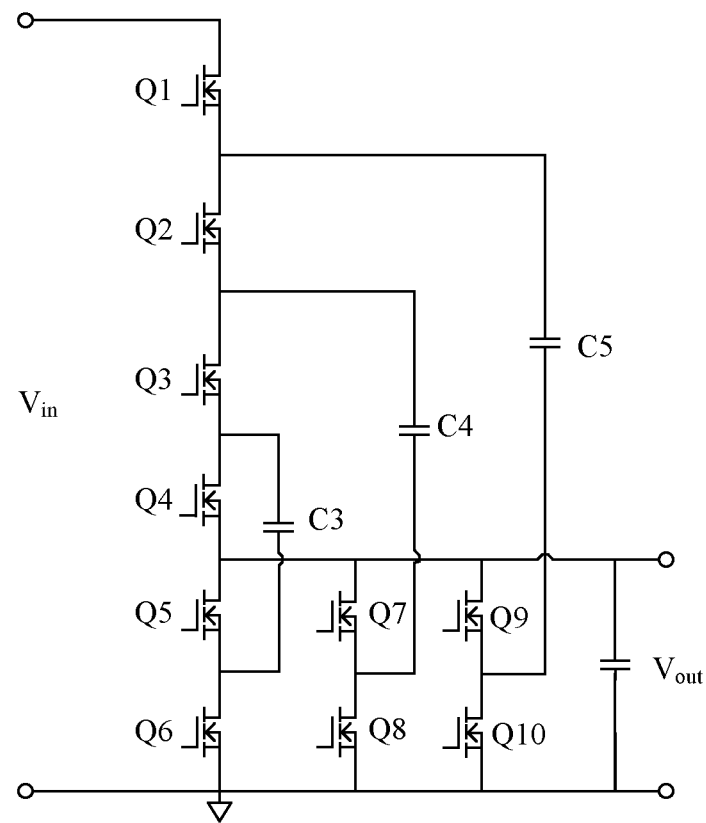
FIG. 5 is a schematic block diagram of a fifth example voltage converter, in accordance with embodiments of the present invention.

Referring now to FIG. 5, shown is a schematic block diagram of a fifth example voltage converter, in accordance with embodiments of the present invention. This particular example switch and capacitor network can include a plurality of the second-type power transistors (e.g., Q2-Q6) connected in series between the second terminal of first-type power transistor Q1 and the reference ground. A first switch group including second-type power transistors Q5 and Q6 can connect between the output terminal and the reference ground. The switch and capacitor network can also include at least one second switch group, which can be coupled in parallel with the first switch group that is connected with the reference ground (e.g., the first switch group including Q5 and Q6). The second switch group can include two second-type power transistors connected in series between the output terminal of the voltage converter and the reference ground.

In particular embodiments, the switch and capacitor network can include two second switch groups connected in parallel, and each second switch group can include two second-type power transistors connected in series between the output terminal of the voltage converter and the reference ground. Here, one second switch group can include power transistors Q7 and Q8 connected in series, and the other second switch group can include power transistors Q9 and Q10 connected in series. The switch and capacitor network can also include additional flying capacitors (e.g., capacitors C3, C4 and C5). First terminals of the additional flying capacitors can respectively be connected with one corresponding common node of two power transistors (e.g., Q5-Q6) in the first switch group that is connected between the output terminal and the reference ground and one corresponding common node of two power transistors (e.g., Q7-Q8, Q9-Q10) in the second switch group. Second terminals of the additional flying capacitors can connect with a corresponding common node of power transistors (e.g., Q1-Q4) that connected between the input terminal and the output terminal.

Figure 6:
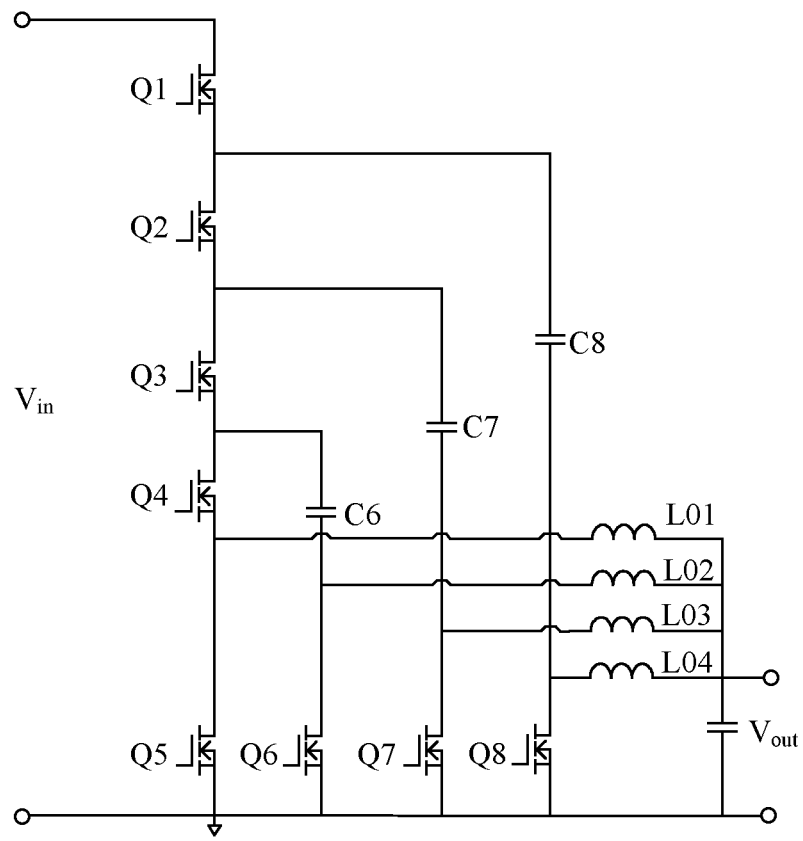
FIG. 6 is a schematic block diagram of a sixth example voltage converter, in accordance with embodiments of the present invention.

Referring now to FIG. 6, shown is a schematic block diagram of a sixth example voltage converter, in accordance with embodiments of the present invention. This particular example switch and capacitor network can include a plurality of the second-type power transistors (e.g., power transistors Q2-Q5) connected in series between the second terminal of first-type power transistor Q1 and the reference ground. In this example, second-type power transistor Q5 connected to the reference ground may not participate in forming the first switch group. The switch and capacitor network can also include N branches, each branch having a flying capacitor and a second-type power transistor connected in series between the corresponding switch node and the reference ground, and where the switch node is a common node between two adjacent power transistors, and N≥1. The switch and capacitor network can also include N+1 inductors, one inductor can connect between the last switch node and the output terminal, and the remaining inductors can connect between the common node of the flying capacitor and the second-type power transistor connected in series and the output terminal. Here, the last switch node may be the common node of two second-type power transistors connected in series to the reference ground.

In particular embodiments, the switch and capacitor network can include three branches, including flying capacitor C6 and second-type power transistor Q6, flying capacitor C7 and second-type power transistor Q7, and flying capacitor C8 and second-type power transistor Q8, respectively connected in series between the corresponding switch node and the reference ground. The switch node is a common node of two adjacent power transistors connected in series between the input terminal and the reference ground, except power transistor Q5. The switch and capacitor network can also include four inductors L01-L04. Inductor L01 can connect between the last switch node (e.g., a common node of power transistors Q4 and Q5) and the output terminal, and the remaining inductors L02-L04 may respectively be connected between one corresponding common node of flying capacitors C6, C7, and C8 and second-type power transistors Q6, Q7, and Q8, and the output terminal.

Figure 7:
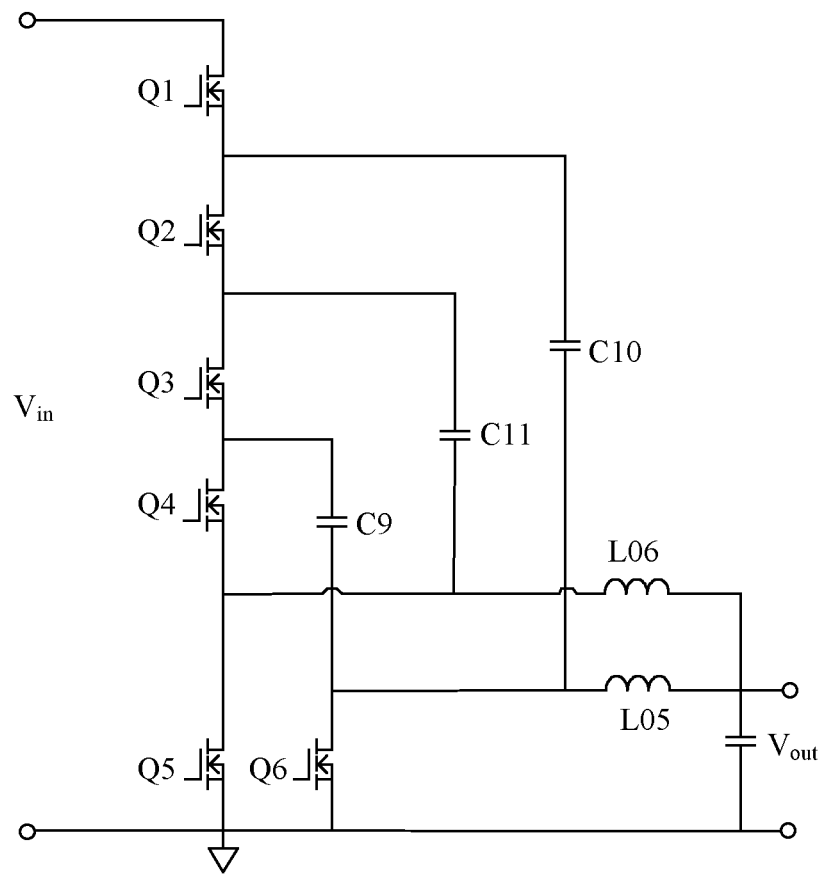
FIG. 7 is a schematic block diagram of a seventh example voltage converter, in accordance with embodiments of the present invention.

Referring now to FIG. 7, shown is a schematic block diagram of a seventh example voltage converter, in accordance with embodiments of the present invention. This particular example switch and capacitor network can include the second-type power transistors (e.g., Q2-Q5) connected in series between the second terminal of first-type power transistor Q1 and the reference ground. In this example, second-type power transistor Q5 connected to the reference ground may not participate in forming the first switch group. The switch and capacitor network can also include a first-type flying capacitor and a second-type power transistor that are connected in series between one corresponding switch node and the reference ground. Here, the switch node is a common node of two adjacent power transistors connected in series between the input terminal and the reference ground. The switch and capacitor network can also include a first-type inductor (e.g., L05) connected between the output terminal and a common node of the first-type flying capacitor (e.g., C9) and the second-type power transistor (e.g., Q6) that are connected in series. Also, a second-type inductor (e.g., L06) can connect between the last switch node and the output terminal. Also, a second-type flying capacitor can connect between the corresponding switch node and one terminal of the second-type inductor. Here, the last switch node is the common node of two second-type power transistors (e.g., Q4 and Q5) connected in series to the reference ground.

Here, the first terminal (e.g., that is not connected to the reference ground) of second-type power transistor Q5 is a first node. The switch and capacitor network can include second-type power transistor Q6, first-type flying capacitors C9 and C10, second-type flying capacitor C11, and first-type inductor L05. In this example, second-type power transistor Q6 can be coupled between the output terminal of the voltage converter and the reference ground, and the first terminal (e.g., that is not connected to the reference ground) of second-type power transistor Q6 is a second node. First-type flying capacitors C9 and C10 may respectively be connected between the second node and the second terminals of other odd-numbered power transistors that are connected in series between the input terminal and the reference ground, except power transistor Q5. Second-type flying capacitor C11 can connect between the first node and the second terminal of the even-numbered power transistors other than power transistor Q5 between the input terminal and the reference ground. The first node and the second node can be respectively connected with the output terminal through a magnetic element.

Before the voltage converter herein is started or has just started, the voltage that the first-type power transistor bears can be the input voltage of the voltage converter, and the voltage across the path from the second terminal of the first-type power transistor to the reference ground via the switch and capacitor network can be zero. The flying capacitors may not be integrated into the first die and the second die, and can connect to the corresponding switch node pins of the package having at least one of the first die and the second die, in order to realize connectivity with the first die and the second die. Further, each magnetic element can connect between the corresponding pin for the switch node of the two corresponding multiplexed power transistors and the output pin, in order to achieve connectivity with the first die and the second die.

In particular embodiments, an integrated driver may be applied to a voltage converter including a switched capacitor conversion circuit. When the voltage converter is just started, the voltage that the first-type power transistor bears can be the input voltage. In this way, the safety of the first-type power transistor can be made more reliable by the first-type power transistor being a GaN transistor, and the second-type power transistor being a silicon transistor, such that the system of the integrated driver achieves higher efficiency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An integrated driver applied to a voltage converter having a switched capacitor conversion circuit, the integrated driver comprising:
    a) a first die having a first-type power transistor;
    b) a second die comprising at least one second-type power transistor, wherein a withstand voltage of the first-type power transistor is higher than a withstand voltage of the second-type power transistor; and
    c) wherein the first die and the second die are coupled in series between a high potential terminal and a low potential terminal of the voltage converter, such that the first-type power transistor receives a high voltage signal,
    d) wherein the first-type power transistor is controlled to be turned on and off coordinately with the second-type power transistor to together maintain an output voltage of the switched capacitor conversion circuit as stable, wherein an on-resistance of the first-type power transistor is smaller than an on-resistance of the second-type power transistor, and a parasitic capacitance of the first-type power transistor is smaller than a parasitic capacitance of the second-type power transistor.

2. The integrated driver of claim 1, wherein the first-type power transistor comprises a gallium nitride (GaN) transistor, and the second-type power transistor comprises a silicon transistor.

3. The integrated driver of claim 1, wherein the voltage converter comprises:
    a) the first-type power transistor having a first terminal connected with an input terminal of the voltage converter; and
    b) a switch and capacitor network coupled between a second terminal of the first-type power transistor and a reference ground.

4. The integrated driver of claim 3, wherein a maximum voltage that the first-type power transistor bears is an input voltage of the voltage converter.

5. The integrated driver of claim 3, wherein before the voltage converter starts up, a voltage that the first-type power transistor bears is greater than a voltage that the second-type power transistor bears, and a voltage across a path from the second terminal of the first-type power transistor to the reference ground via the switch and capacitor network is zero.

6. The integrated driver of claim 3, wherein the voltage that the first-type power transistor bears when the voltage converter operates normally is smaller than the voltage that the first-type power transistor bears before the voltage converter is started.

7. The integrated driver of claim 3, wherein the switch and capacitor network comprises a plurality of the second-type power transistors connected in series between the second terminal of the first-type power transistor and the reference ground.

8. The integrated driver of claim 7, wherein the switch and capacitor network further comprises at least one switch group having two second-type power transistors connected in parallel between an output terminal of the voltage converter and the reference ground.

9. The integrated driver of claim 8, wherein the switch and capacitor network further comprises a plurality of flying capacitors, wherein at least one flying capacitor is connected in parallel with the corresponding power transistors.

10. The integrated driver of 9, wherein the flying capacitors of the switch and capacitor network are not integrated into the first die and the second die, and the flying capacitors are connected to corresponding switch node pins of a package comprising at least one of the first die and the second die, in order to realize connectivity with the first die and second die.

11. An integrated driver applied to a voltage converter having a switched capacitor conversion circuit, the integrated driver comprising:
    a) a first die comprising a first-type power transistor and at least one second-type power transistor, wherein a withstand voltage of the first-type power transistor is higher than a withstand voltage of the second-type power transistor; and
    b) wherein the first die is coupled in series between a high potential terminal and a low potential terminal of the voltage converter, such that the first-type power transistor receives a high voltage signal,
    c) wherein the first-type power transistor is controlled to be turned on and off coordinately with the second-type power transistor to together maintain an output voltage of the switched capacitor conversion circuit as stable, wherein an on-resistance of the first-type power transistor is smaller than an on-resistance of the second-type power transistor, and a parasitic capacitance of the first-type power transistor is smaller than a parasitic capacitance of the second-type power transistor.

12. The integrated driver of claim 11, wherein the first-type power transistor and at least one of the second-type power transistors share one substrate.

13. The integrated driver of claim 11, wherein the first-type power transistor comprises a gallium nitride (GaN) power transistor, and the second-type power transistor comprises a silicon transistor.

* * * * *